US011675001B2

(12) United States Patent
Alfarano et al.

(10) Patent No.: US 11,675,001 B2
(45) Date of Patent: Jun. 13, 2023

(54) METHOD, SYSTEM AND COMPUTER PROGRAM PRODUCT FOR INTRODUCING PERSONALIZATION DATA IN NONVOLATILE MEMORIES OF A PLURALITY OF INTEGRATED CIRCUITS (71) Applicant: STMicroelectronics S.r.l., Agrate Brianza (IT)

(72) Inventors: Marco Alfarano, Naples (IT); Sofia Massascusa, Caserta (IT)

(73) Assignee: STMicroelectronics S.r.l.

(*) Notice: Subject to any disclaimer, the term of this patent is extended or adjusted under 35 U.S.C. 154(b) by 296 days.

(21) Appl. No.: 17/036,135

(22) Filed: Sep. 29, 2020

(65) Prior Publication Data
US 2021/0096178 A1    Apr. 1, 2021

(30) Foreign Application Priority Data
Sep. 30, 2019   (IT) .................... IT102019000017561

(51) Int. Cl.
G01R 31/28      (2006.01)
G01R 31/3183    (2006.01)
G11C 16/14      (2006.01)
G11C 16/26      (2006.01)
G11C 29/38      (2006.01)
G11C 29/40      (2006.01)

(52) U.S. Cl.
CPC ..... G01R 31/2896 (2013.01); G01R 31/2856 (2013.01); G01R 31/3183 (2013.01); G11C 16/14 (2013.01); G11C 16/26 (2013.01); G11C 29/38 (2013.01); G11C 2029/4002 (2013.01)

(58) Field of Classification Search
CPC ............ G01R 31/3183; G01R 31/2856; G01R 31/2896; G11C 16/14; G11C 16/26; G11C 29/38; G11C 2029/4002
See application file for complete search history.

(56) References Cited

U.S. PATENT DOCUMENTS

| 6,014,748 A * | 1/2000 | Tushie ................. G06Q 20/367 257/679 |
| 2009/0236414 A1* | 9/2009 | Finkenzeller .... G06K 19/07716 414/222.01 |
| 2016/0249203 A1* | 8/2016 | Mazali .................. H04W 8/183 |
| 2016/0321053 A1* | 11/2016 | Laurence ........... G06Q 20/3558 |
| 2019/0090129 A1 | 3/2019 | Yang et al. |
| 2019/0306697 A1* | 10/2019 | Veneroso ................ H04W 4/50 |
| 2019/0354667 A1 | 11/2019 | Alfarano et al. |

FOREIGN PATENT DOCUMENTS

| EP | WO2004063999 A1 * | 7/2004 | ............... G07F 7/10 |
| EP | 3483772 A1 * | 5/2020 | ............ G06F 21/72 |
| WO | 0178020 A1 | 10/2001 | |
| WO | WO 0178020 A1 * | 10/2001 | ............... G07F 7/10 |

* cited by examiner

Primary Examiner — Alvaro E Fortich
Assistant Examiner — Dilara Sultana
(74) Attorney, Agent, or Firm — Slater Matsil, LLP (57) ABSTRACT Embodiments of the present disclosure relate to solutions for introducing personalization data in nonvolatile memories of a plurality of integrated circuits, comprising writing in the nonvolatile memory of a given integrated circuit a static data image, corresponding to an invariant part of nonvolatile memory common to the plurality of integrated circuits, and a personalization data image representing data specific to the given integrated circuit.

20 Claims, 9 Drawing Sheets

METHOD, SYSTEM AND COMPUTER PROGRAM PRODUCT FOR INTRODUCING PERSONALIZATION DATA IN NONVOLATILE MEMORIES OF A PLURALITY OF INTEGRATED CIRCUITS

CROSS-REFERENCE TO RELATED APPLICATIONS

This application claims the benefit of Italian Application No. 102019000017561, filed on Sep. 30, 2019, which application is hereby incorporated herein by reference.

TECHNICAL FIELD

Embodiments of the present disclosure relate to solutions for introducing personalization data in nonvolatile memories of a plurality of integrated circuits, comprising writing in the nonvolatile memory of a given integrated circuit a static data image, corresponding to an invariant part of nonvolatile memory common to the plurality of integrated circuits, and a personalization data image representing data specific to the given integrated circuit.

Further embodiments of the present disclosure relate to integrated circuits produced with WLCSP (Wafer Level Chip Scale Packaging) techniques, in particular to integrated circuits for UICC (Universal Integrated Circuit Card) and more particularly to embedded UICC (eUICC).

BACKGROUND

The solution refers to generation of batches of integrated circuits, in particular integrated cards such eUICC, each personalized with the introduction of personalization data (sometimes referred to as "perso data"), e.g., encryption keys or identifiers, specific for each integrated circuit in the card.

Under this view, Wafer Level Chip Scale Packaging (WLCSP), also referred to as Wafer-Level packaging (WLP) or Chip Scale Packaging (CSP), is a known technology for packaging an integrated circuit while still part of the wafer. Such wafer level processing is in contrast to conventional methods of slicing the wafer into individual circuits (chips, or dice) and then packaging them. WLCSP is truly a chip-scale package since the resulting package is the same size as the die. A WLCSP package usually includes the integrated circuit die, a possible redistribution Layer (RDL) and solder balls or bumps. The redistribution Layer is required to route from peripherally located bond wire pads to a grid array of CSP pad locations. WLCSP can be a good choice for small pin count devices as a way to optimize area and cost. Alternatively, the integrated circuit can be laid out with bond-wire I/O pads on the periphery of the integrated circuit. A redistribution Layer can then be applied to the integrated circuit to redistribute the CSP ball pads to the desired grid spacing.

In the field of chips for some applications such as SIM, banking, identification and authentication, which mainly are introduced in integrated circuit cards, the integrated circuit modules cannot be identical; they have to be diversified by a personalization operation to include a respective Unique identifier and/or encryption keys and other personalization data.

Usually, to produce an eUICC (embedded Universal Integrated Circuit Card), the OEM (Original Equipment Manufacturer) and/or the MNO (Mobile Network Operator) requests of the EUM (eUICC Manufacturer) a batch of integrated circuit modules for mobile connectivity.

Figures 1, 2:
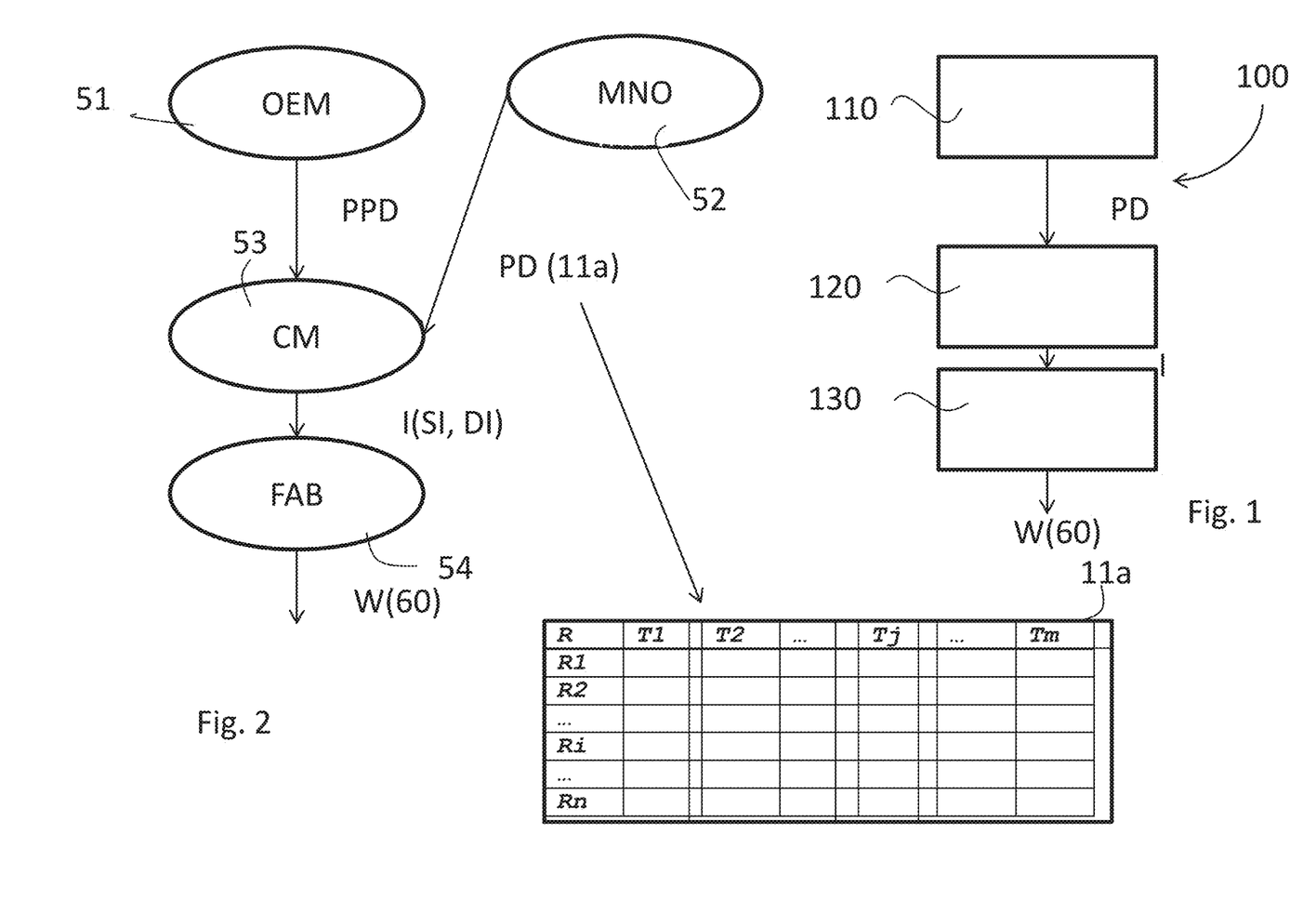
FIG. 1 shows a flow diagram of a known method 100 for introducing personalization data in nonvolatile memories of a plurality of integrated circuits.
FIG. 2 shows a schematic of an embodiment 50 of a system for introducing personalization data in nonvolatile memories of a plurality of integrated circuits.

FIG. 1 shows a flow diagram exemplary of a known method 100 for introducing personalization data in nonvolatile memories of a plurality of integrated circuits, which are specifically eUICCs produced by WLCSP.

FIG. 2 shows a schematic of an embodiment 50 of a system for introducing personalization data in nonvolatile memories of a plurality of integrated circuits, which can implement the method 100.

Thus, with reference to FIGS. 1 and 2, in a first step 110 a Mobile Network Operator 52 sends to a Chip Manufacturer 53 an input file PD with personalization data, for instance a personalization data table 11a as shown in FIG. 2, to generate personalization data (e.g., IMSI, ICCID, RSA/ECC certificate, encryption keys and other identifiers, certificates or keys specific of the a specific card/chip). The Chip Manufacturer 53, which usually corresponds to the card vendor for integrated cards like the eUICC, may also receive from an Equipment User Manufacturer 51, i.e., the entity which has requested the plurality of integrated circuits, or the same MNO 52 pre-personalization data PPD, which includes for instance the operative system, and other data which are common to the plurality of integrated circuits and form a static image SI, i.e., a data image, to be stored in the nonvolatile memory of the integrated circuit.

The data table 11a, as shown in FIG. 2, includes a plurality of records $R_1 \ldots R_n$, corresponding to the rows of the table 11a. Each i-th record R; corresponds to a determined i-th integrated circuit card 60 in a set or batch comprising a number n of card 60 to be personalized.

Each column of the personalization data table 11a include then a personalization field $T_1 \ldots T_j \ldots T_m$, m being the number of fields in the table 11a and j the integer index of the personalization field, in which a different type of personalization value is stored. In some fields among the personalization fields $T_1 \ldots T_m$ can be stored the Crypto Keys, in other fields the PIN numbers, the Unique Id and other personalization data.

Then the Chip Manufacturer 53 prepares in a step 120 a batch or batches of nonvolatile memory images I, containing static images SI, and personalization images DI to be sent to the semiconductor fabrication plant 54 producing the integrated circuits.

The semiconductor fabrication plant 54 thus prepares in a step 130 integrated circuits 60, which are in this embodiment on wafers W, with personalized integrated circuit modules ready to be cut and soldered/embedded as eUICC in a device such as a SIM in a smartphone or tablet. Such integrated circuits 60 in general include at least a nonvolatile memory, in which data images can be stored for programming the integrated circuit, and usually also a processing unit, as in the case of integrated circuit card for banking and communication application, e.g., UICC and eUICC.

The WLCSP process applied in the last step 130 described above has some constraints in providing the nonvolatile memory images, which are provided as follows: one Static Image SI, corresponding to an invariant part of the nonvolatile memory; and a plurality of personalization images DI, each one corresponding to a final integrated circuit module, i.e., chip or die.

The nonvolatile memory images are provided in S19 (also known as SREC or S-RECORD) format coded format, encrypted.

Also there is no overlap in the nonvolatile memory between the Static Image and the respective personalization images in each module.

Also the process dictates requirements such as a minimum, maximum or fixed memory slice dimension (e.g., 8 bytes) and base addresses alignment (e.g., 4 bytes). The memory slice is defined as a contiguous linear memory starting at a given pointer or address and spanning for a given length, in this case the dimension of 8 bytes.

There are different approaches to perform the step 130 above.

A first approach provides that personalization data, i.e., personalization images DI are bound in a dedicated memory section. This has the advantage that the size and position of the personalization data image can be decided at design time and overlap is intrinsically avoided. The drawback is that each product has its own management of personalization data, that requires a First Boot Routine (FBR) of the operating system dedicated to parse and store personalization data. Also the personalization data area may vary product by product, and the first boot of modules takes time to process personalization data. In a similar context, third parties personalization applets can be a difficult issue, as the use of memory may be not under full control, and as a matter of fact it can be unknown.

A second known approach provides that the memory image is extracted by using a simulator. While this has the advantage of not needing a physical module, the drawback is that the simulator must reproduce perfectly such physical module.

A third known approach provides that personalization data are sent via ISO APDUs (Application Protocol Data Units) by the Chip Manufacturer. This solution determines that Personalization Data are managed only by certified Chip Manufacturers, and also provide decoupling Pre-Personalization and Personalization steps in the case of preprocessed stocks. However, the integrated circuits have to be moved from the semiconductor plant to the chip manufacturer and the time taken by the personalization is quite slow.

Summarizing, with the first approach products must be conceived in a different way in comparison to the past, as a dedicated memory area and a first boot procedure routine are required. The first boot time to wait also represents a problem and may not acceptable at all. The second approach is flawed by the fact that simulators/emulators are not 100% reliable, while the third approach is slow at the least.

SUMMARY

On the basis of the foregoing description, the need is felt for solutions which overcome one or more of the previously outlined drawbacks.

According to one or more embodiments, such an object is achieved through methods having the features specifically set forth in the claims that follow. Embodiments moreover concern a related system for the personalization of integrated circuit card modules as well as a corresponding related computer program product, loadable in the memory of at least one computer and including software code portions for performing the steps of the method when the product is run on a computer. As used herein, reference to such a computer program product is intended to be equivalent to reference to a computer-readable medium containing instructions for controlling a computer system to coordinate the performance of the method. Reference to "at least one computer" is evidently intended to highlight the possibility for the present disclosure to be implemented in a distributed/modular fashion.

The claims are an integral part of the technical teaching of the disclosure provided herein.

As mentioned in the foregoing, the present disclosure provides solutions regarding a method for introducing personalization data in nonvolatile memories of a plurality of integrated circuits, comprising writing in the nonvolatile memory of a given integrated circuit a static data image, corresponding to an invariant part of nonvolatile memory common to the plurality of integrated circuits including an operating system, and personalization data images representing data specific of the given integrated circuit, the personalization data pertaining a given integrated circuit being arranged in a set of personalization data fields. The method includes a procedure of generation of test data images to be stored in the nonvolatile memory comprising, for each data field in the set of personalization data fields performing an iterative procedure comprising at each iteration the operations of erasing a nonvolatile memory of a test integrated circuit corresponding to the plurality of integrated circuits, storing the operating system in the nonvolatile memory, storing test personalization data in the nonvolatile memory, the storing comprising generating instances of the test personalization data on the basis of a provided reference version of test personalization data arranged in the set of data fields, the first instance at the first iteration corresponding to the provided reference version and the following instances in following iterations corresponding to the reference version subject to an alteration applied on a different data field for each iteration. The method further comprises dumping an image of the nonvolatile memory corresponding to the current test instance, performing iteratively the procedure of generation till the last data field in the set of data fields personalization obtaining a corresponding set of test dumped images one for each data field in the set of personalization data fields, comparing each test dumped image with the test dumped image obtained from the reference version extracting respective location information regarding the memory area in the nonvolatile memory at which the test dumped image differs from the test dumped image obtained from the reference version, processing the location information to identify a static memory image containing only invariant memory slices and a dynamic memory image associated to a substitution table indicating the location of memory area corresponding to each data field, and writing in an integrated circuit of the plurality of integrated circuits the static image and a dynamic personalized image obtained filling at corresponding locations of memory area in the dynamic memory image obtained from the substitution table the content of respective data fields in personalization data to be specifically associated to the integrated circuit.

In various embodiments, the integrated circuit is disposed in an integrated circuit card, in particular an eUICC.

In various embodiments, the processing the memory locations includes identifying the memory slice at which the alteration occurs and a subsequent step of identification of the position index in the memory slice at which the alteration occurs.

In various embodiments, the method includes organizing the reference version of test personalization data arranged in the set of data fields in a tuple structure and that the alteration is applied on a different data field for each iteration by introducing the content of a corresponding data field in a further alteration tuple over the same set of data fields but with different data in each data field.

In various embodiments, the storing test personalization data in the nonvolatile memory includes using a personalization script comprising a sequence of commands, in particular APDU, configured to store the personalization data, the personalization script being configured to use personalization data from the reference version and one data from the further alteration tuple to apply the alteration on a different data field for each iteration by introducing the content of a corresponding data field in a further alteration tuple over the same set of data fields but with different data in each data field.

The present disclosure provides also solutions regarding a system for introducing personalization data in nonvolatile memories of a plurality of integrated circuits, including a chip manufacturer and a factory, configured to introduce personalization data in nonvolatile memories of a plurality of integrated circuits according to the method previously described.

In various embodiments, the chip manufacturer is configured to process the location information to identify a static memory image containing only invariant memory slices and a dynamic memory image associated to a substitution table indicating the location of memory area corresponding to each data field and to send the static and dynamic image to the factory which is configured for writing in an integrated circuit of the plurality of integrated circuits the static image and a dynamic personalized image obtained filling at corresponding locations of memory area in the dynamic memory image obtained from the substitution table the content of respective data fields in personalization data to be specifically associated to the integrated circuit.

In various embodiments, the factory is configured to produce the integrated circuits according to WLCSP (Wafer Level Chip Scale Packaging) techniques, performing the writing operation on integrated circuits on a wafer.

The present disclosure provides also solutions regarding a computer-program product that can be loaded into the memory of at least one processor and comprises portions of software code for implementing the method of any of the previous embodiments.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figures parts, elements or components which have already been described with reference to FIGS. 1 and 2 are denoted by the same references previously used in such Figures; the description of such previously described elements will not be repeated in the following in order not to overburden the present detailed description.

The solution here described substantially regards a method for introducing personalization data in nonvolatile memories of a plurality of integrated circuits, in particular including manufacturing a plurality of chip in a WLCSCP packaging process, which comprises building a static image and respective personalization data images for each integrated circuit in the plurality of integrated circuits prior to storing the static image and respective personalization data images in the corresponding integrated circuit, in particular in the corresponding integrated circuit still on wafer according to the WLCSCP packaging process.

Such building a static image and respective personalization data images for each integrated circuit in the plurality of integrated circuits, in particular an integrated circuit packaged as a smartcard, uses a conventional operating system, configured to be personalized by using APDU, and determined image-building personalization data to obtain a set of nonvolatile memory images, which are processed to obtain location of memory areas that finally contain personalization data, the list of all the locations being processed to a separate Static Memory Image, which contains invariant memory slices from an integrated circuit to another in the plurality of integrated circuits and a Dynamic Memory Image, which contains both invariant memory locations and target areas for personalization data for the respective integrated circuit in the plurality of integrated circuits.

It is noted that the method preferably is applied to circuits using an operating system in which memory changes not corresponding to personalization data values are not allowed outside a Transaction Buffer area.

Such method solves the problems of the approaches discussed previously, as it does not require a personalization data dedicated area in the memory, a first boot routine with first boot execution time, allows third parties applet personalization data management. Since it is not based on simulation of course the solution does not present simulator image unreliability and also does not require moving the integrated circuits from the plant to the chip manufacturer for the personalization.

In general for introducing personalization data in an integrated circuit in a device, a Full Personalization Script is provided, which is a parametric script meant to configure a module once it is embedded and accessible with APDUs. Such Full Personalization Script includes a sequence of proper APDUs that fully personalize a product according to product requirements.

Figure 3:
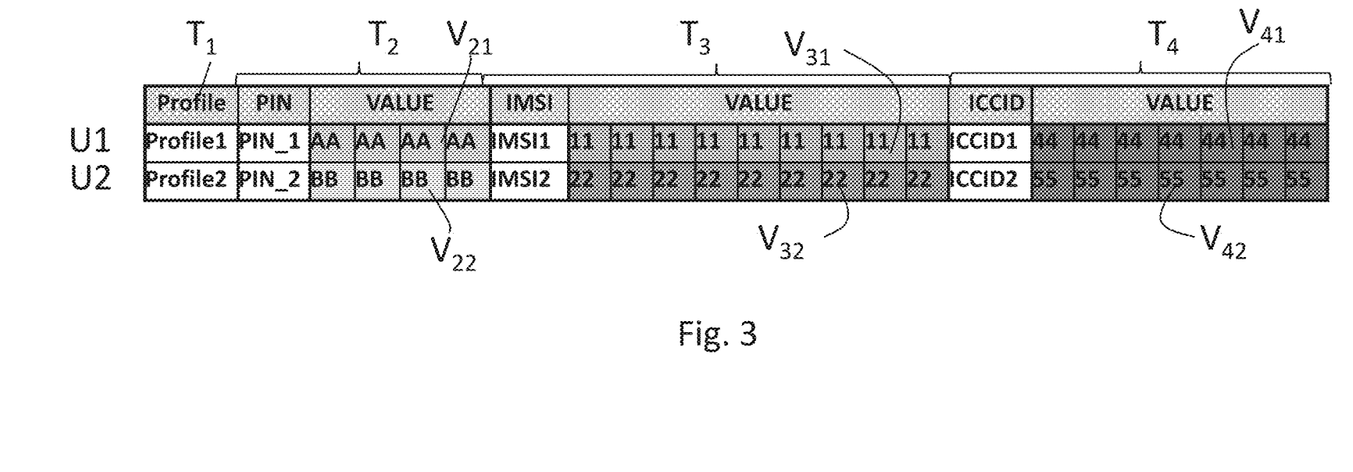
FIG. 3 shows a data structure used by an embodiment of the method here described.
Figure 4:
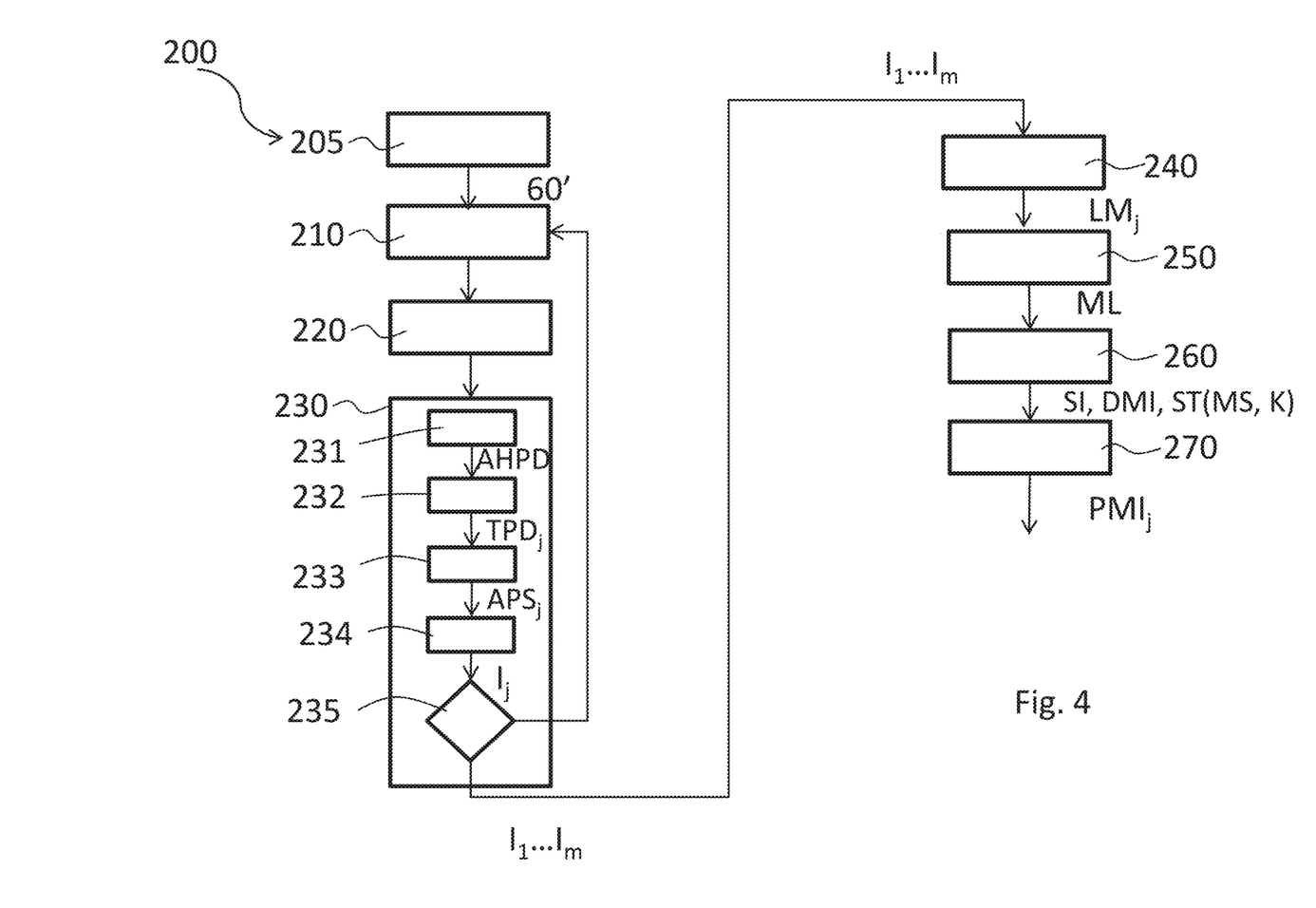
FIG. 4 shows a diagram flow illustrating an embodiment of the method here described.
Figure 5:
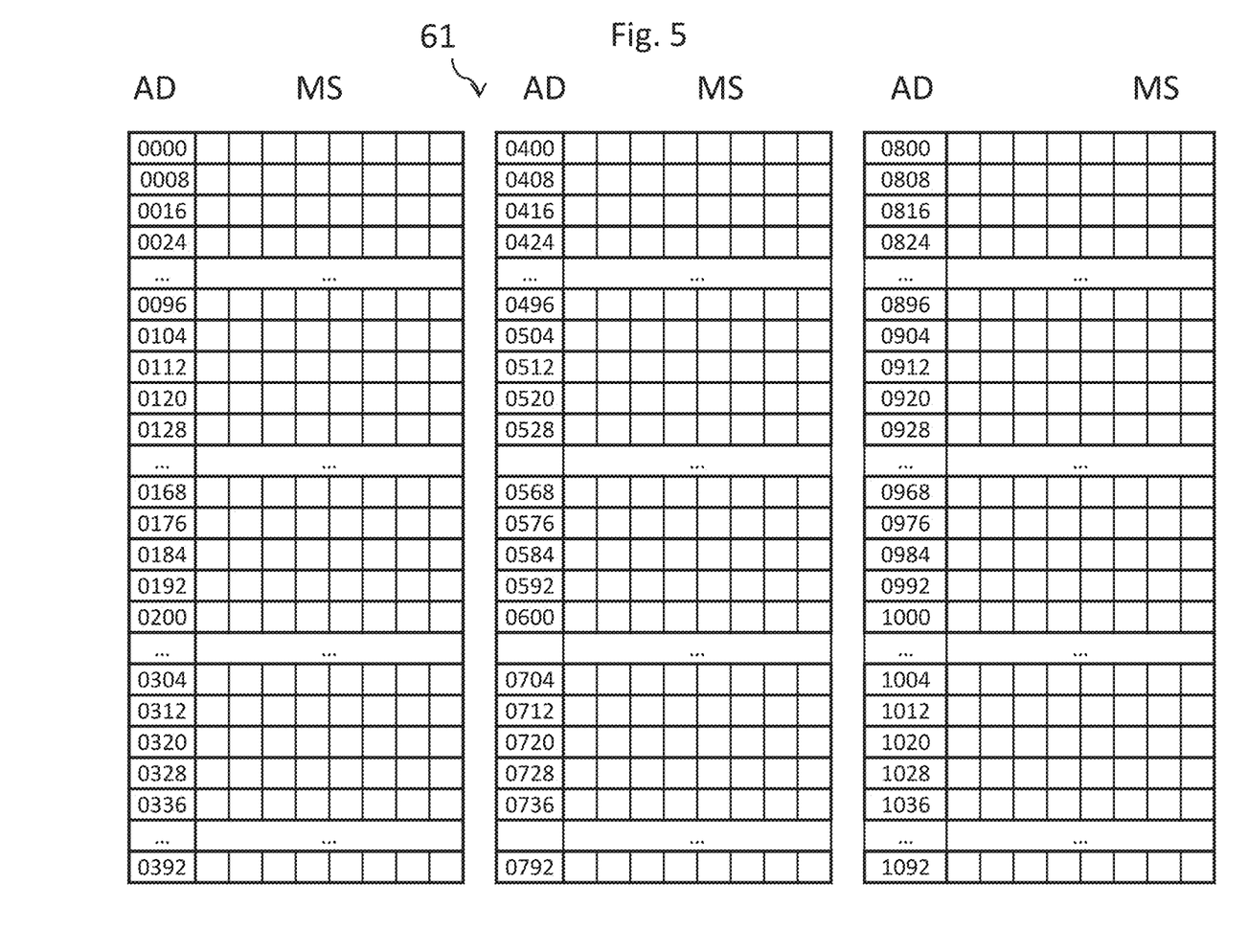
FIGS. 5-10 show schematic representations of a nonvolatile memory in different phases of an embodiment of the method herein described.

FIG. 3 shows an image building personalization data set AHPD, which, as shown in the following, in particular with reference to the method described in the flow diagram of FIG. 4, is used to build memory images, which contains both invariant memory areas and locations and target areas for personalization data for the respective integrated circuit in the plurality of integrated circuits.

The image building personalization data set AHPD includes test personalization data TPD arranged in a set of data fields $T_1 \ldots T_m$, in particular $T_1 \ldots T_4$ in the example. As show, this can be represented as a plurality of tuples, in particular a pair of tuples U1, U2 like in FIG. 3, such that for each field $T_1 \ldots T_4$ of the two tuples the corresponding value, i.e., test personalization data value, contained in the data field is different from one tuple to the other. It is observed that also more than two tuples may be used, for instance for reliability tests. According to the solution starting from such image building personalization data set AHPD and from the Full Personalization Script, applied to a test integrated circuit, a set of Altered Personalization Scripts APS is built. Each script $APS_j$ of this set of Altered Personalization Scripts APS uses all the personalization values from the first tuple, e.g., values in fields $T_1 \ldots T_4$ of the tuple U1 except only one, and uses only one value of the second tuple U2, i.e., each Altered Personalization Script $APS_j$ introduces one alteration only at time, corresponding to the one selected value of the second or alteration tuple U2 corresponding to the j-th data field, in the entire data image, which is thus the j-th data image $I_j$, to be written in the nonvolatile memory of the integrated circuit.

As mentioned, FIG. 3 shows a table representing the image building personalization data set AHPD, including a first or reference tuple U1, corresponding to a first profile, and a second or alteration tuple U2, corresponding to a second profile. As it is clear for the person skilled in the art, the tuples can correspond to the rows of the table 11a.

The fields shown in FIG. 3 are labeled:

Profile $T_1$ indicating to which profile the tuple refers, Profile 1 or Profile 2, PIN $T_2$ containing the pin code label, PIN-1 or PIN_2, followed by value, with four columns comprising four hexadecimal values of the PIN code, value $V_{11}$ AA, AA, AA, AA for U1 and $V_{21}$, BB, BB, BB, BB for U2, then the field includes in the same way a IMSI label $T_3$, IMSI_1 or IMSI_2 followed by four IMSI values, $V_{31}$ equal to 11, 11, 11, 11 for U1, $V_{32}$ equal to 22, 22, 22, 22 for U2, and a ICCID label $T_4$, ICCID_1 or ICCID_2 followed by four ICCID values, $V_4$ equal to 44, 44, 44, 44 for U1, $V_{42}$ equal to 55, 55, 55, 55 for U2.

FIG. 4 shows a flow diagram representing an embodiment 200 of the method for introducing personalization data in nonvolatile memories of a plurality of integrated circuits here described.

The method includes that a test integrated circuit 60' is provided in a step 205, which is the same integrated circuit of the integrated circuits 60 in the batch to be produced at the factory 54.

Then an iterative procedure is performed, performing an iteration for each personalization field $T_1 \ldots T_m$ in the personalization data PD. Thus, for each current personalization field $T_j$, with j from 1 to m, which in the examples is m=4:

in a step 210 the nonvolatile memory 61 of the test integrated circuit 60' is erased;

then in a step 220 the operative system is loaded in the nonvolatile memory 61 of the test integrated circuit 60'; subsequently in a step 230 test personalization data TPD are loaded into the nonvolatile memory of the test integrated circuit 60' using APDU transmitted to the circuit 60' or card comprising the test integrated circuit 60'. The step 230 includes:

providing 231 an image building personalization data set AHPD comprising a reference version of test personalization data TPD arranged in the set of data fields a first personalization tuple U1 representing a reference version including test data TPD in the set of data fields $T_1 \ldots T_m$, as shown in FIG. 3, generating 232 a sequence of instances $TPD_1 \ldots TPD_m$ of test personalization data TPD on the basis of the reference version U1, the first instance, i.e., for j=1, corresponding to the provided reference version U1 and the following instances, i.e., for j=2 ... m, in following iterations corresponding to the reference version U1 subject to an alteration applied on a different data field for each iteration. In particular the alteration is applied on a different data field $T_1 \ldots T_m$ for each iteration by introducing the content of a corresponding data field, i.e., corresponding to the current data field, in a further alteration tuple, i.e., tuple U2, over the same set of data fields $T_1 \ldots T_m$, but with different data in each data field. Of course step 232 may generate one instance $TPD_j$ for each iteration or generate all the instances $TPD_1 \ldots TPD_m$ and then pick the instance $TPD_j$ in the sequence corresponding to the current data field T;

storing 233 the current instance $TPD_j$ in the nonvolatile memory of the integrated circuit 60'. In particular this is done using the image building personalization data set AHPD, i.e., the reference tuple U1 and alteration tuple U2 with the Full Personalization Script to build at each iteration j a corresponding Altered Personalization Scripts APS, which uses all the personalization values from the first tuple, e.g., values in fields T1 ... T4 of tuple U1, and only one value of the further tuple U2, i.e., each Altered Personalization Script $APS_j$ introduces one alteration only at each iteration time, corresponding to the value of the alteration tuple U2 for the current personalization field $T_j$, in the j-th entire data image $I_j$ to be written in the nonvolatile memory of the integrated circuit. This storing operation preferably includes a final lock operation to lock the position of the personalization data stored in the nonvolatile memory. The lock is performed for instance by way of a card lock APDU. Such lock preferably is reversible;

dumping 234 an image $I_j$ of the nonvolatile memory corresponding to the current instance $TPD_j$ of test personalization data TPD;

then in a block 235 is evaluated if the current field $T_j$ is the last field, performing iteratively the procedure of generation till the last data field in the set of data fields personalization obtaining a corresponding set of test dumped images $I_j$ one for each data field in the set of data fields as output of the operation 230.

The method then includes comparing in a step 240 each test dumped image $I_j$ with the test dumped image obtained from the reference version, i.e., the first test dumped image I, extracting memory locations of the memory area $LM_j$ in the nonvolatile memory of the integrated circuit 60' at which the dumped image $I_j$ differs from the dumped image $I_1$ obtained from the reference version. Finally a set of memory location of memory areas $LM_2 \ldots LM_m$ is obtained corresponding to the target areas for personalization data for the respective integrated circuit in the plurality of integrated circuits. In a step 250 is then performed the identification through the memory locations $LM_j$ of the memory area or slices corresponding to a static memory image SI, i.e., containing only invariant memory slices MS, and to a dynamic memory image DMI, obtaining a location map ML indicating the memory areas of the nonvolatile memory in which the dynamic memory images $DMI_j$ corresponding to the different fields $T_j$ are to be stored.

In a step 260, a normalization step is performed, which produces a substitution table ST indicating the slice MS of the nonvolatile memory 61 in which a certain target area, i.e., memory area in which the dynamic image corresponding to a certain data field is to be stored, and a position index k in such slice MS. Following the normalization step 260, a static image SI and a dynamic image DMI formed by the set of dynamic memory images DMI corresponding to the different fields $T_j$, are made available together with such substation table ST. The static image SI, since data are invariant, represents already the static image which will be the programmed in all the integrated circuits 60 s of the batch. The dynamic image represents the target area to be filled in by the actual personalization data PD.

Thus, then in a step 270 the actual personalization data PD are stored in the corresponding target area of the dynamic images $DMI_j$ using the information on the location (slice MS, index k) in the substitution table ST, obtaining dynamic personalized images PMI in the nonvolatile memory of the integrated circuit 60. In the embodiment here described this step 270 takes place when programming the WLCSP integrated circuit 60 before packaging, i.e., steps 210-260 can be performed at the Chip Manufacturer 53 at a given time obtaining the static image SI, the dynamic image DMI and the substitution table ST, while the filling step 270 can take place at the semiconductor plant 54 at a subsequent time.

In FIGS. 5-10 it is represented a nonvolatile memory 61 of the test integrated circuit 60', shown as a matrix in which the first column contains the memory address AD and the following columns, eight in the example, represents each a byte of a memory page or memory slice MS, i.e., a memory with 8 byte granularity.

Figure 6:
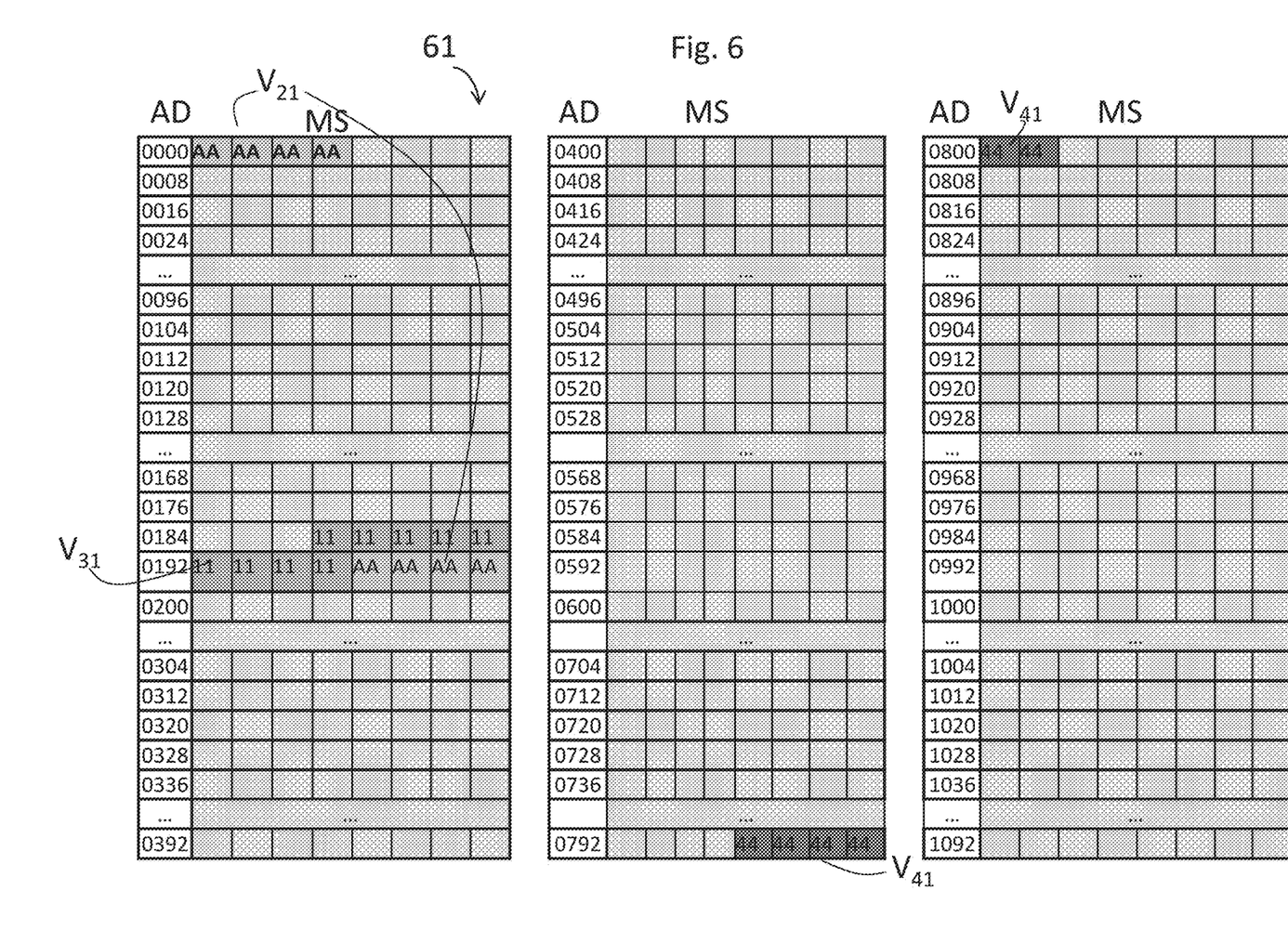

FIG. 6 represents the memory 61 after the first personalization, i.e., performing step 233 with first instance $TPD_1$ (j=1) obtained from the reference tuple U1 data. Target areas corresponding to data field T2, T3, T4 are shown, containing the values of the first profile, i.e., tuple U1, $V_{21}$, $V_{31}$, $V_{41}$.

Figure 7:
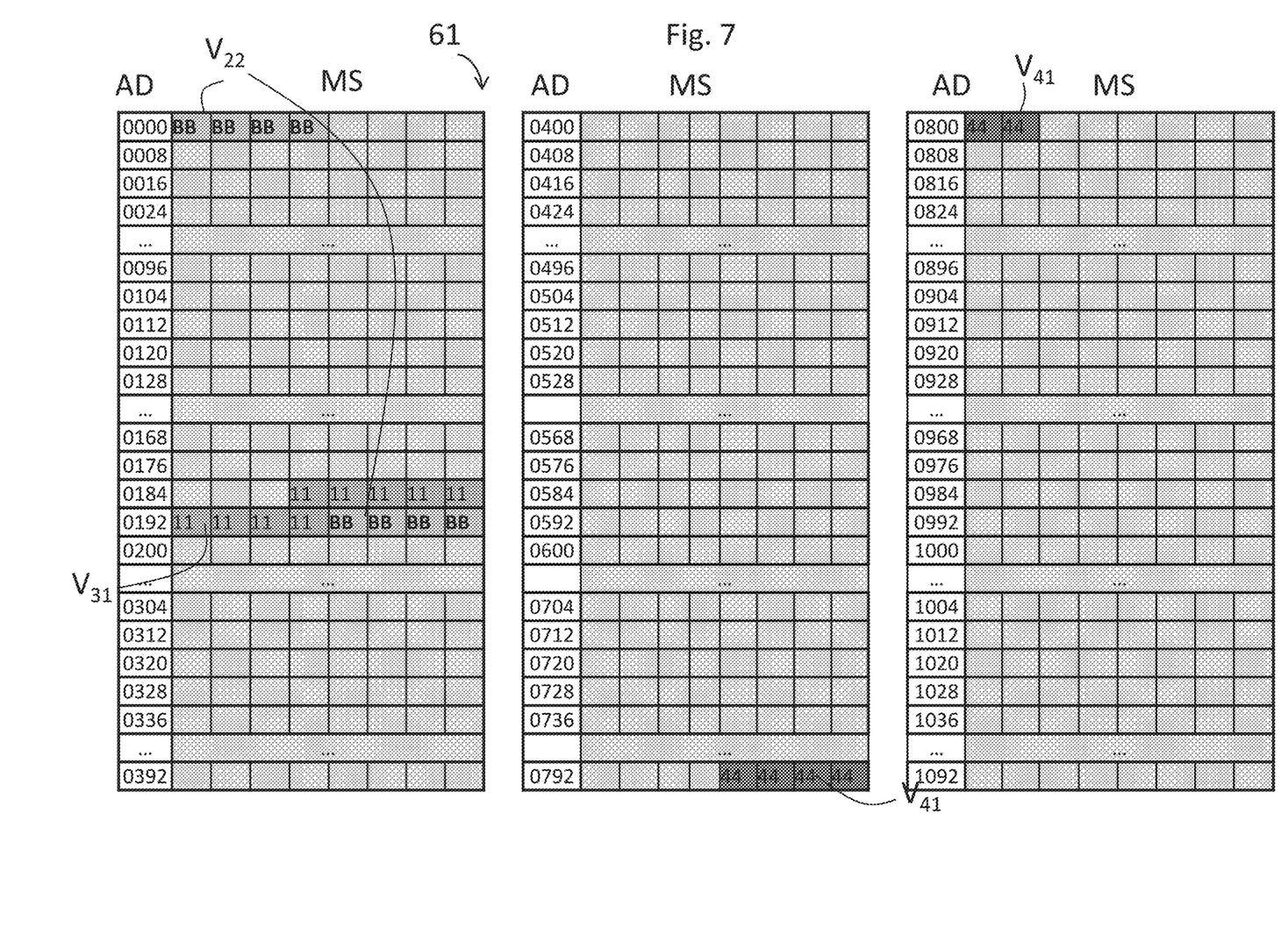

FIG. 7 represents the memory 61 after the second personalization, i.e., performing first step 232 to obtain an instance $TPD_2$ corresponding to the reference version U1 subject to an alteration applied on a different data field for each iteration, in particular the alteration being applied on the data field $T_2$ introducing the value $V_{22}$ of the corresponding data field, i.e., the values of the PIN code in this case from the second or further alteration tuple U2. The second instance $TPD_2$ is then stored in the storing step 233.

Figure 8:
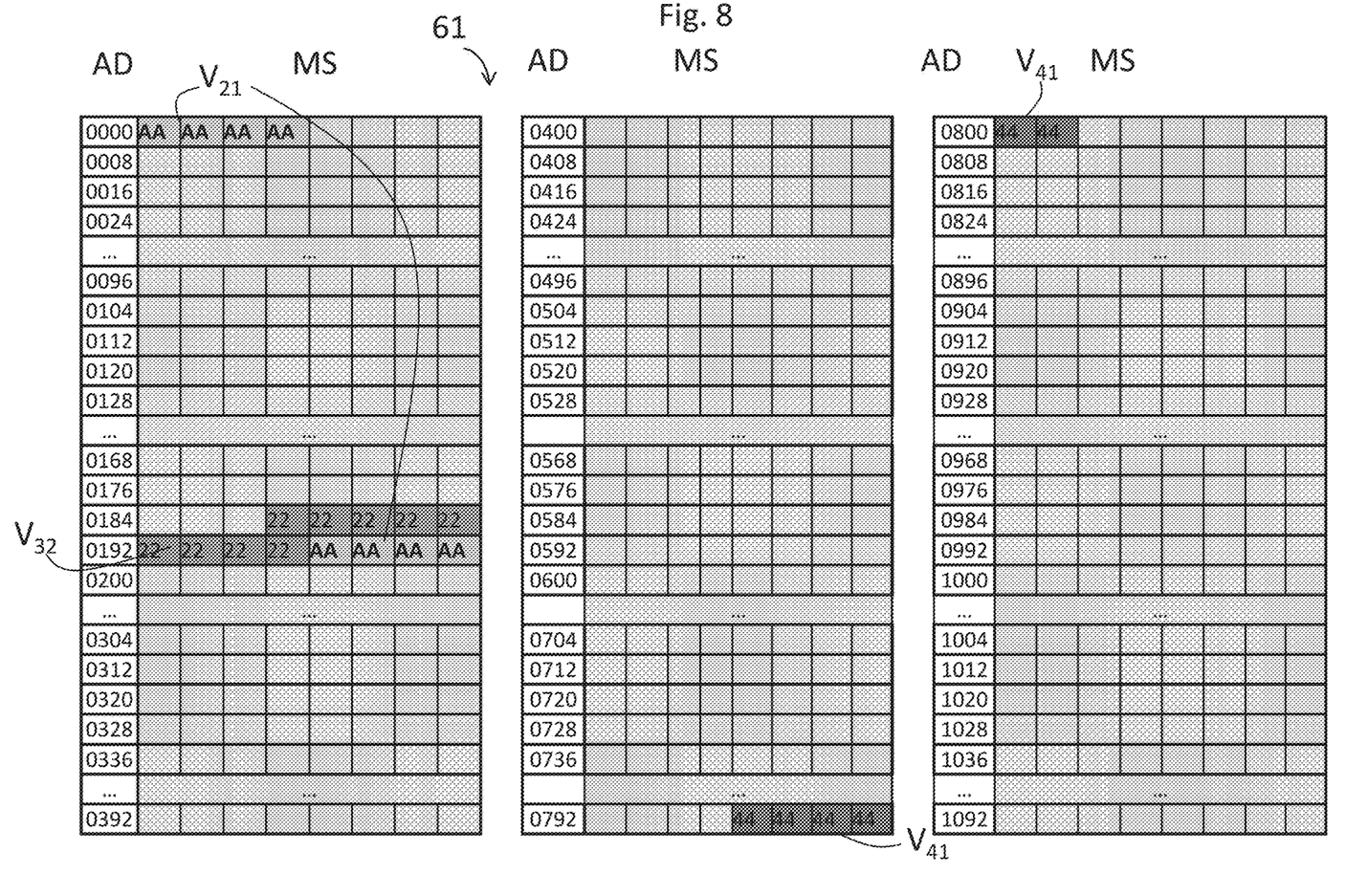

FIG. 8 represents the memory 61 after the second personalization, i.e., performing first step 232 to obtain an instance $TPD_3$ corresponding to the reference version U1 subject to an alteration applied on a different data field for each iteration, in particular the alteration being applied on the data field $T_3$ introducing the value $V_{32}$ of the corresponding data field, i.e., the values of the IMSI code in this case from the second or further alteration tuple U2. The third instance $TPD_3$ is then stored in the storing step 233.

Figure 9:
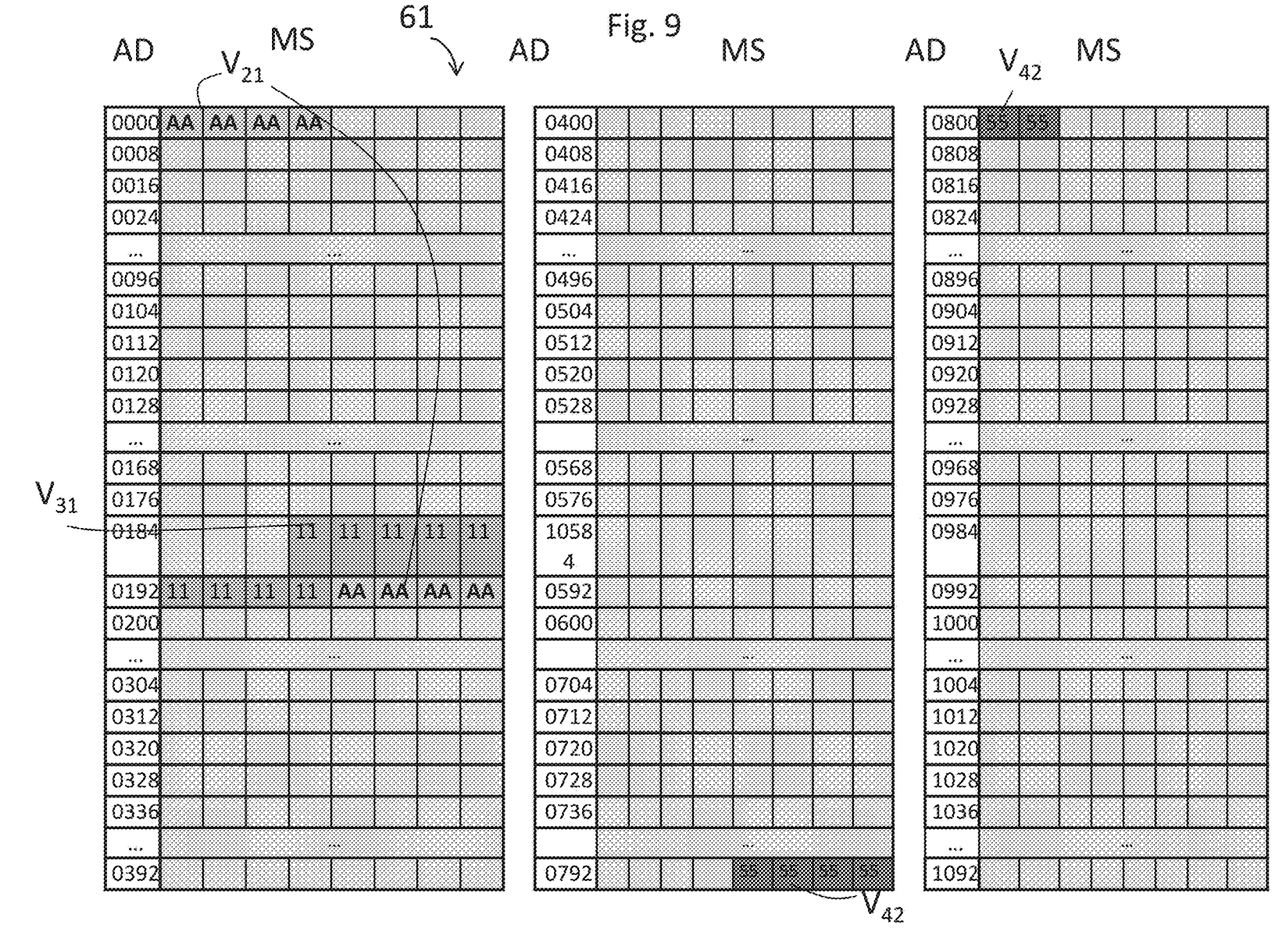

FIG. 9 represents the memory 61 after the third personalization, i.e., performing first step 232 to obtain an instance $TPD_4$ corresponding to the reference version U1 subject to an alteration applied on a different data field for each iteration, in particular the alteration being applied on the data field $T_4$ introducing the value $V_{42}$ of the corresponding data field, i.e., the values of the ICCID code in this case from the second or further alteration tuple U2. The third instance $TPD_3$ is then stored in the storing step 233.

Figure 10:
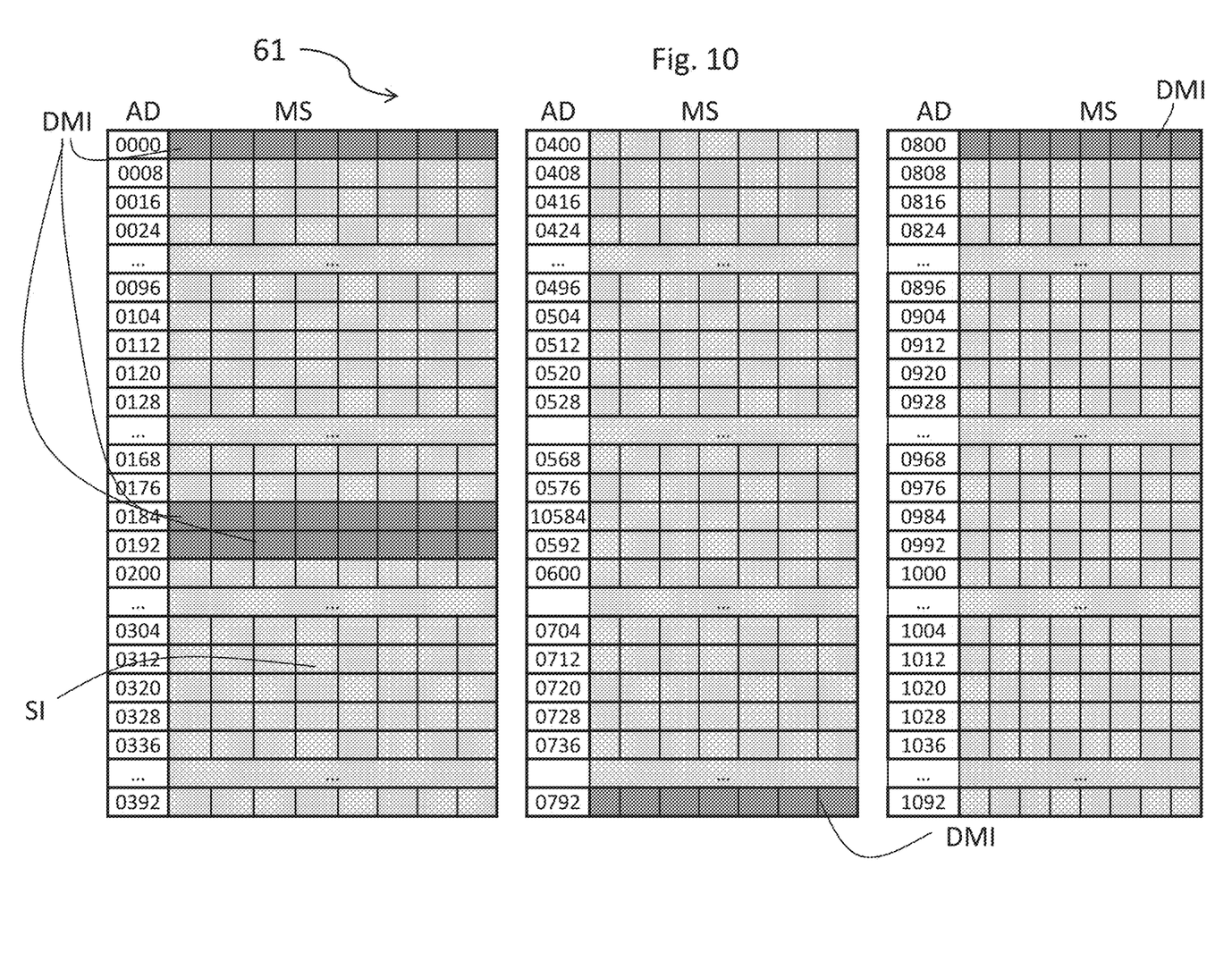

In FIG. 10 it is represented the result of the comparison 250 on the memory 61. Comparing the memory images I respectively with memory images 12 first, then with memory images 13, then with memory images 14 and so on, the memory areas affected by the personalization are identified. Every memory area is considered part of a memory slice taking into account the memory page granularity. Thus the memory slices starting at address AD=0000, 0184, 0192, 0792, 0800 are identified as pertaining to the dynamic images, while the rest of the memory is Static Image SI.

The described solution allows thus to introduce personalization data without requiring a personalization data dedicated area in the memory, a first boot routine with first boot execution time, and allows third parties applet personalization data management. Since it is based on a test integrated circuit which is equal to those of the batch to be produced, and it is not based on simulation the solution does not present simulator image unreliability and also does not require moving the integrated circuits from the plant to the chip manufacturer for the personalization.

Of course, without prejudice to the principle of the invention, the details of construction and the embodiments may vary widely with respect to what has been described and illustrated herein purely by way of example, without thereby departing from the scope of the present invention, as defined by the ensuing claims.

The method here described in particular can be applied to the introduction of personalization data in integrated circuits for smart cards like eUICC and iUICC, but also in various embodiments to integrated circuits for other device such as Secure Elements, NFC tags, VPP, SSP, which have a nonvolatile memory to be programmed with personalization data.

Also, while a preferred embodiment provides that the integrated circuits are produced by a WLCSP, Wafer Level Chip Scale Packaging, so that the method of introduction of personalization data here described can be performed while the integrated circuit is still on the wafer, and then it is cut and possibly soldered on a plastic support or in place in a device, however the method here described can be applied also to an integrated circuit already separated by the wafer, in particular already mounted on the support or embedded in a device.

What is claimed is:

1. A method for introducing personalization data in nonvolatile memories of a plurality of integrated circuits, comprising:
    writing, in the nonvolatile memory of a first integrated circuit, a static data image corresponding to an invariant part of nonvolatile memory common to the plurality of integrated circuits including an operating system;
    writing, in the nonvolatile memory of the first integrated circuit, personalization data images representing data specific to the first integrated circuit, the personalization data being arranged in a set of personalization data fields;
    generating, for storage in the nonvolatile memory, test data images, the generating comprising, for each data field in the set of personalization data fields, performing an iterative procedure comprising, for each iteration:
        erasing a nonvolatile memory of a test integrated circuit corresponding to the plurality of integrated circuits;
        storing the operating system in the nonvolatile memory of the test integrated circuit;

storing test personalization data in the nonvolatile memory of the test integrated circuit, the storing the test personalization data comprising generating instances of the test personalization data based on a provided reference version of test personalization data arranged in the set of personalization data fields;
a first instance at a first iteration corresponding to the provided reference version and subsequent instances in subsequent iterations corresponding to the provided reference version subject to an alteration applied on a different data field for each iteration; and
dumping an image of the nonvolatile memory of the test integrated circuit corresponding to a current test instance;
performing iteratively the generating the test data images until a last data field in the set of personalization data fields obtains a corresponding set of test dumped images, one for each data field in the set of personalization data fields;
comparing each test dumped image with a test dumped image obtained from the provided reference version, and extracting respective location information regarding a memory area in the nonvolatile memory of the test integrated circuit at which the test dumped image differs from the test dumped image obtained from the provided reference version;
processing the location information to identify a static memory image containing only invariant memory slices, and a dynamic memory image associated with a substitution table indicating a location of memory area corresponding to each data field; and
writing in a second integrated circuit of the plurality of integrated circuits the static data image and a dynamic personalized image obtained by storing at corresponding locations of a memory area in the dynamic memory image obtained from the substitution table, a content of respective data fields in the personalization data specifically associated with the second integrated circuit.

2. The method of claim 1, wherein the second integrated circuit is disposed in an integrated circuit card.

3. The method of claim 2, wherein the integrated circuit card is an embedded Universal Integrated Circuit Card (eUICC).

4. The method of claim 1, wherein the processing the location information comprises:
identifying a first memory slice at which the alteration occurs; and
identifying a position index in the first memory slice at which the alteration occurs.

5. The method of claim 1, further comprising:
organizing the provided reference version of the test personalization data in the set of personalization data fields in a tuple structure; and
applying the alteration on a different data field for each iteration by introducing a content of a corresponding data field in a further alteration tuple over a same set of data fields using different data in each data field.

6. The method of claim 5, wherein the storing the test personalization data in the nonvolatile memory of the test integrated circuit comprises using a personalization script including a sequence of commands configured to store the personalization data, the personalization script being configured to use personalization data from the provided reference version and one data from the further alteration tuple to apply the alteration on the different data field for each iteration by introducing the content of the corresponding data field in the further alteration tuple over the same set of data fields using the different data in each data field.

7. The method of claim 6, wherein the commands are Application Protocol Data Units (APDUs).

8. A first system for introducing personalization data in nonvolatile memories of a plurality of integrated circuits, including a chip manufacturer and a factory, the first system configured to:
write, in the nonvolatile memory of a first integrated circuit, a static data image corresponding to an invariant part of nonvolatile memory common to the plurality of integrated circuits including an operating system;
write, in the nonvolatile memory of the first integrated circuit, personalization data images representing data specific to the first integrated circuit, wherein the personalization data is arranged in a set of personalization data fields;
generate, for storage in the nonvolatile memory, test data images, the generate comprising, for each data field in the set of personalization data fields, the first system configured to perform an iterative procedure comprising, for each iteration:
erase a nonvolatile memory of a test integrated circuit corresponding to the plurality of integrated circuits;
store the operating system in the nonvolatile memory of the test integrated circuit;
store test personalization data in the nonvolatile memory of the test integrated circuit, wherein the first system configured to store the test personalization data comprises the first system configured to generate instances of the test personalization data based on a provided reference version of test personalization data arranged in the set of personalization data fields;
wherein a first instance at a first iteration corresponds to the provided reference version and subsequent instances in subsequent iterations correspond to the provided reference version subject to an alteration applied on a different data field for each iteration; and
dump an image of the nonvolatile memory of the test integrated circuit corresponding to a current test instance;
perform iteratively the generating the test data images until a last data field in the set of personalization data fields obtains a corresponding set of test dumped images, one for each data field in the set of personalization data fields;
compare each test dumped image with a test dumped image obtained from the provided reference version, and extract respective location information regarding a memory area in the nonvolatile memory of the test integrated circuit at which the test dumped image differs from the test dumped image obtained from the provided reference version;
process the location information to identify a static memory image containing only invariant memory slices, and a dynamic memory image associated with a substitution table indicating a location of memory area corresponding to each data field; and
write in a second integrated circuit of the plurality of integrated circuits the static data image and a dynamic personalized image obtained by storing, at corresponding locations of a memory area in the dynamic memory image obtained from the substitution table, a content of respective data fields in the personalization data specifically associated with the second integrated circuit.

9. The first system of claim 8, wherein the chip manufacturer is configured to process the location information, and send the static and dynamic memory images to the factory; and
wherein the factory is configured to write in the second integrated circuit of the plurality of integrated circuits the static data image and the dynamic personalized image.

10. The first system of claim 8, wherein the factory is configured to produce the integrated circuits according to wafer level chip scale packaging techniques, and to perform write operations on integrated circuits on a wafer.

11. The first system of claim 8, wherein the second integrated circuit is disposed in an integrated circuit card.

12. The first system of claim 11, wherein the integrated circuit card is an embedded Universal Integrated Circuit Card (eUICC).

13. The first system of claim 8, wherein the first system configured to process the location information comprises the first system configured to:
identify a first memory slice at which the alteration occurs; and
identify a position index in the first memory slice at which the alteration occurs.

14. The first system of claim 8, wherein the first system is configured to:
organize the provided reference version of the test personalization data in the set of personalization data fields in a tuple structure; and
apply the alteration on a different data field for each iteration by introducing a content of a corresponding data field in a further alteration tuple over a same set of data fields using different data in each data field.

15. The first system of claim 14, wherein the first system configured to store the test personalization data in the nonvolatile memory of the test integrated circuit comprises the first system configured to use a personalization script including a sequence of commands configured to store the personalization data, wherein the personalization script is configured to use personalization data from the provided reference version and one data from the further alteration tuple to apply the alteration on the different data field for each iteration by introducing the content of the corresponding data field in the further alteration tuple over the same set of data fields using the different data in each data field.

16. The first system of claim 15, wherein the commands are Application Protocol Data Units (APDUs).

17. A computer-program product loadable into a memory of at least one processor and comprising portions of software code for introducing personalization data in nonvolatile memories of a plurality of integrated circuits, the portions of software code configured to:
write, in the nonvolatile memory of a first integrated circuit, a static data image corresponding to an invariant part of nonvolatile memory common to the plurality of integrated circuits including an operating system;
write, in the nonvolatile memory of the first integrated circuit, personalization data images representing data specific to the first integrated circuit, wherein the personalization data is arranged in a set of personalization data fields;
generate, for storage in the nonvolatile memory, test data images, the generate comprising, for each data field in the set of personalization data fields, the portions of software code configured to perform an iterative procedure comprising, for each iteration:
erase a nonvolatile memory of a test integrated circuit corresponding to the plurality of integrated circuits;
store the operating system in the nonvolatile memory of the test integrated circuit;
store test personalization data in the nonvolatile memory of the test integrated circuit, wherein the portions of software code configured to store the test personalization data comprises the portions of software code configured to generate instances of the test personalization data based on a provided reference version of test personalization data arranged in the set of personalization data fields;
wherein a first instance at a first iteration corresponds to the provided reference version and subsequent instances in subsequent iterations correspond to the provided reference version subject to an alteration applied on a different data field for each iteration; and
dump an image of the nonvolatile memory of the test integrated circuit corresponding to a current test instance;
perform iteratively the generating the test data images until a last data field in the set of personalization data fields obtains a corresponding set of test dumped images, one for each data field in the set of personalization data fields;
compare each test dumped image with a test dumped image obtained from the provided reference version, and extract respective location information regarding a memory area in the nonvolatile memory of the test integrated circuit at which the test dumped image differs from the test dumped image obtained from the provided reference version;
process the location information to identify a static memory image containing only invariant memory slices, and a dynamic memory image associated with a substitution table indicating a location of memory area corresponding to each data field; and
write in a second integrated circuit of the plurality of integrated circuits the static data image and a dynamic personalized image obtained by storing at corresponding locations of a memory area in the dynamic memory image obtained from the substitution table, a content of respective data fields in the personalization data specifically associated with the second integrated circuit.

18. The computer-program product of claim 17, wherein the second integrated circuit is disposed in an integrated circuit card.

19. The computer-program product of claim 17, wherein the portions of software code configured to process the location information comprise the portions of software code configured to:
identify a first memory slice at which the alteration occurs; and
identify a position index in the first memory slice at which the alteration occurs.

20. The computer-program product of claim 17, wherein the portions of software code are configured to:
organize the provided reference version of the test personalization data in the set of personalization data fields in a tuple structure; and
apply the alteration on a different data field for each iteration by introducing a content of a corresponding data field in a further alteration tuple over a same set of data fields using different data in each data field.

* * * * *

UNITED STATES PATENT AND TRADEMARK OFFICE
CERTIFICATE OF CORRECTION

PATENT NO. : 11,675,001 B2
APPLICATION NO. : 17/036135
DATED : June 13, 2023
INVENTOR(S) : Alfarano et al.

Page 1 of 1

It is certified that error appears in the above-identified patent and that said Letters Patent is hereby corrected as shown below:

On the Title Page

Item (73), in Column 1, in "Assignee", Line 1, delete "S.r.l." and insert -- S.r.l., Agrate Brianza (IT) --, therefor.

Item (30), in Column 1, under "Foreign Application Priority Data", Line 1, delete "IT102019000017561" and insert -- 102019000017561 --, therefor.

In the Claims

In Column 11, in Claim 1, Line 35, delete "storing" and insert -- storing, --, therefor.

In Column 14, in Claim 17, Line 41, delete "storing" and insert -- storing, --, therefor.

Signed and Sealed this
Fifth Day of September, 2023

Katherine Kelly Vidal
*Director of the United States Patent and Trademark Office*